(12) United States Patent
Jung et al.

(10) Patent No.: US 10,599,002 B2
(45) Date of Patent: Mar. 24, 2020

(54) ELECTRO-CHROMIC PANEL AND DISPLAY APPARATUS INCLUDING THE SAME

(71) Applicant: Samsung Display Co., Ltd., Yongin-si, Gyeonggi-do (KR)

(72) Inventors: Sunyoung Jung, Suwon-si (KR); Soyoung Lee, Suwon-si (KR); Sanghwan Cho, Suwon-si (KR); Chungsock Choi, Seoul (KR)

(73) Assignee: Samsung Display Co., Ltd. (KR)

( * ) Notice: Subject to any disclaimer, the term of this patent is extended or adjusted under 35 U.S.C. 154(b) by 235 days.

(21) Appl. No.: 15/783,750

(22) Filed: Oct. 13, 2017

(65) Prior Publication Data

US 2018/0107085 A1    Apr. 19, 2018

(30) Foreign Application Priority Data

Oct. 13, 2016   (KR) .......................... 10-2016-0132922

(51) Int. Cl.
*G02F 1/153*    (2006.01)
*G02F 1/03*    (2006.01)
(Continued)

(52) U.S. Cl.
CPC .............. *G02F 1/153* (2013.01); *G02F 1/155* (2013.01); *G02F 1/161* (2013.01); *G02F 2201/44* (2013.01)

(58) Field of Classification Search
CPC ...... G02F 1/155; G02F 1/1523; G02F 1/1525; G02F 1/1521; G02F 1/1533; G02F 1/03;
(Continued)

(56) References Cited

U.S. PATENT DOCUMENTS 6,157,480 A  * 12/2000  Anderson ............... G02F 1/161
                                                     359/265
2008/0297676 A1* 12/2008  Kimura ............... G02F 1/13624
                                                     349/39
(Continued)

FOREIGN PATENT DOCUMENTS

EP          3260914 A1    12/2017
JP          55077724 A  *  6/1980
(Continued)

OTHER PUBLICATIONS

Araki et. al, "Electrochromic Materials Electrochemical Optical-Modulation Device with Reversible Transformation Between Transparent, Mirror, and Black", Adv. Mater. 2012, 24, OP122-OP126.

*Primary Examiner* — Dawayne Pinkney
(74) *Attorney, Agent, or Firm* — Innovation Counsel LLP

(57) ABSTRACT

An electro-chromic panel includes a first substrate and a second substrate. the first substrate includes a bottom portion, an upper portion disposed higher than the bottom portion, the upper portion being spaced apart from bottom portion and surrounding the bottom portion, and slope portions disposed between the bottom portion and the upper portion to connect a boundary of the bottom portion and an inner boundary of the upper portion. A first electrode is disposed on the bottom portion and a predetermined portion of a slope portion connected to one side of the bottom portion, a second electrode is disposed to overlap the bottom portion and a slope portion connected to other sides of the bottom portion, and an electro-chromic device is disposed between the first substrate and the second substrate in a first groove defined by the bottom portion and the slope portion.

20 Claims, 7 Drawing Sheets

(51) Int. Cl.
  *G02F 1/15* (2019.01)
  *G09G 3/19* (2006.01)
  *H04N 9/16* (2006.01)
  *G02F 1/155* (2006.01)
  *G02F 1/161* (2006.01)

(58) Field of Classification Search
  CPC .......... G02F 1/0316; G02F 3/16; G02F 1/163; C09K 9/02; B60R 1/088; H04N 9/3137; H04N 9/22
  USPC ........ 359/265–275, 277, 245–247, 254, 242; 345/49, 105; 250/70; 348/817; 438/929
  See application file for complete search history.

(56) References Cited

U.S. PATENT DOCUMENTS

2009/0207513 A1* 8/2009 Luten .................... B60R 1/088
                                                            359/839
2017/0371220 A1    12/2017 Cho et al.

FOREIGN PATENT DOCUMENTS

| KR | 10-0771905 B1 | 11/2007 |
| KR | 10-2014-0073754 A | 6/2014 |
| KR | 10-2014-0085973 A | 7/2014 |
| KR | 10-1480951 B1 | 1/2015 |

\* cited by examiner

[Saturation current per 1cm² according to gap thickness]

ELECTRO-CHROMIC PANEL AND DISPLAY APPARATUS INCLUDING THE SAME

CROSS-REFERENCE TO RELATED APPLICATION

This U.S. non-provisional patent application claims priority under 35 U.S.C. § 119 of Korean Patent Application No. 10-2016-0132922, filed on Oct. 13, 2016, the contents of which are hereby incorporated by reference in its entirety.

BACKGROUND

1. Field of Disclosure

The present disclosure relates to an electro-chromic panel and a display apparatus including the same, more particularly, to an electro-chromic panel to secure a space for disposing an electron-chromic device and a display apparatus including the electro-chromic panel.

2. Description of the Related Art

In general, an electro-chromic panel includes an electro-chromic device that changes its color depending on an electrical signal. The electro-chromic device is disposed between a first electrode disposed on a first substrate and a second electrode disposed under a second substrate to face the first electrode. The electro-chromic device includes an ion storage layer, an electrolyte layer, and an electro-chromic layer.

When a potential difference is generated between the first electrode and the second electrode according to a difference between an electric potential of the first electrode and an electric potential of the second electrode, ions or electrons of the electrolyte layer move toward the electro-chromic layer. As the ions or the electrons move in the electro-chromic layer, an oxidation-reduction reaction occurs in the electro-chromic layer, and as a result, a color of the electro-chromic device is changed.

When a current flows from the electro-chromic layer to the ion storage layer, the electro-chromic layer is colored, and when the current flows from the ion storage layer to the electro-chromic layer, the electro-chromic layer is discolored. However, coloring and discoloring reactions occur in reverse according to materials of the electro-chromic layer. When the electro-chromic layer is colored, the electro-chromic panel operates in a reflective mode to reflect a light, and when the electro-chromic layer is discolored, the electro-chromic panel operates in a transmissive mode to transmit the light.

The electro-chromic panel is widely used in devices such as a smart window, an automobile room mirror, and a display device, etc., which utilize a light transmission characteristic. In the electro-chromic panel, a space for disposing the electro-chromic is required.

SUMMARY

The present disclosure provides an electro-chromic panel for effectively securing a space for disposing an electron-chromic device and a display apparatus including the electro-chromic panel.

Embodiments of the inventive concept provide an electro-chromic panel including a first substrate, a first electrode disposed on the first substrate, a second substrate facing the first substrate, a second electrode disposed under the second substrate to face the first electrode, and an electro-chromic device disposed between the first substrate and the second substrate. The first substrate includes a bottom portion facing the second substrate, an upper portion disposed higher than the bottom portion, the upper portion spaced apart from the bottom portion and surrounding the bottom portion when viewed in a plane substantially parallel to the bottom portion, and slope portions disposed between the bottom portion and the upper portion to connect a boundary of the bottom portion and an inner boundary of the upper portion adjacent to the boundary of the bottom portion. The first electrode is disposed on both the bottom portion and a predetermined portion of a slope portion connected to one side of the bottom portion, the second electrode is disposed to overlap the bottom portion and a slope portion of the slope portions, the slope portion connected to at least one of other sides of the bottom portion, and the electro-chromic device is disposed between the first substrate and the second substrate in a first groove defined by the bottom portion and the slope portions.

The bottom portion has a rectangular shape having long sides in a first direction and short sides in a second direction crossing the first direction.

The slope portions include a first slope portion connected to the one side of the bottom portion in the first direction and a plurality of second slope portions connected to the other sides of the bottom portion. The first slope portion includes a first sub-slope portion connected to the one side of the bottom portion in the first direction, having the same width as the bottom portion in the second direction, and extending in the first direction. The first and second slope portions are connected to each other to surround the bottom portion and a width of each of the first and second slope portions gradually increases from the bottom portion toward the upper portion.

The first electrode is disposed on the bottom portion, the first sub-slope portion, and a predetermined portion of an upper portion connected to the first sub-slope portion.

The second electrode is disposed to overlap the bottom portion, the second slope portions, and a predetermined portion of an upper portion connected to the second slope portions.

The first and second slope portions have a slope angle of about 2.8 to about 89.4 degrees with respect to a third direction substantially perpendicular to the plane parallel to the first and second directions.

A gap between the first electrode and the second electrode in the first groove to the third direction is within a range of about 100 micrometers to about 1000 micro meters.

The electro-chromic panel further includes a sealing member disposed in a second groove which surrounds the first groove and is provided to a predetermined area of the upper portion.

The second groove has a depth smaller than a depth of the first groove.

The second groove extends through an area in which the first electrode is disposed.

The sealing member is disposed on the first electrode in a portion of the second groove overlapping with the first electrode The sealing member comprises an organic material or an inorganic material The electro-chromic panel further includes a sealing member disposed on a predetermined portion of the upper portion, surrounding the first groove, and attaching the first substrate to the second substrate The electro-chromic device is disposed in a space, which is closed by the sealing member, between the first substrate and the second substrate.

The sealing member comprises a plurality of spacers comprising an inorganic material.

The sealing member extends through an area of the upper portion in which the first electrode is disposed, and a portion of the first electrode overlapping with the sealing member comprises a plurality of open portions.

The upper portion comprises: a first upper portion connected to the slope portion connected to the one side of the bottom portion; and a second upper portion connected to the slope portion connected to at least one of the other sides of the bottom portion, and the first upper portion has a height lower than a height of the second upper portion.

The electro-chromic panel further comprising a sealing member disposed on a predetermined portion of the upper portion and surrounding the first groove, and attaching the first substrate to the second substrate, and a thickness of a sealing member disposed on the first upper portion of the sealing member is greater than a thickness of a sealing member disposed on the second upper portion of the sealing member.

The sealing member disposed on the first upper portion comprises a plurality of spacers comprising an inorganic material.

Embodiments of the inventive concept provide a display apparatus including a display panel displaying an image and an electro-chromic panel disposed on the display panel. The electro-chromic panel includes a first substrate, a first electrode disposed on the first substrate, a second substrate facing the first substrate, a second electrode disposed under of the second substrate to face the first electrode, and an electro-chromic device disposed between the first substrate and the second substrate. The first substrate includes a bottom portion facing the second substrate, an upper portion disposed higher than the bottom portion, the upper portion spaced apart from the bottom portion and surrounding the bottom portion when viewed in a plane substantially parallel to the bottom portion, and slope portions disposed between the bottom portion and the upper portion to connect a boundary of the bottom portion and an inner boundary of the upper portion adjacent to the boundary of the bottom portion. The first electrode is disposed on both the bottom portion and a predetermined portion of a slope portion connected to one side of the bottom portion, the second electrode is disposed to overlap the bottom portion and a slope portion of the slope portions, the slope portion connected to at least one of other sides of the bottom portion of the slope portions, and the electro-chromic device is disposed between the first substrate and the second substrate in a first groove defined by the bottom portion and the slope portions.

According to the above, the electro-chromic panel and the display apparatus including the electro-chromic panel may effectively secure a space for disposing an electron-chromic device.

BRIEF DESCRIPTION OF THE DRAWINGS

The above and other advantages of the present disclosure will become readily apparent by reference to the following detailed description when considered in conjunction with the accompanying drawings wherein.

DETAILED DESCRIPTION

Figure 1:
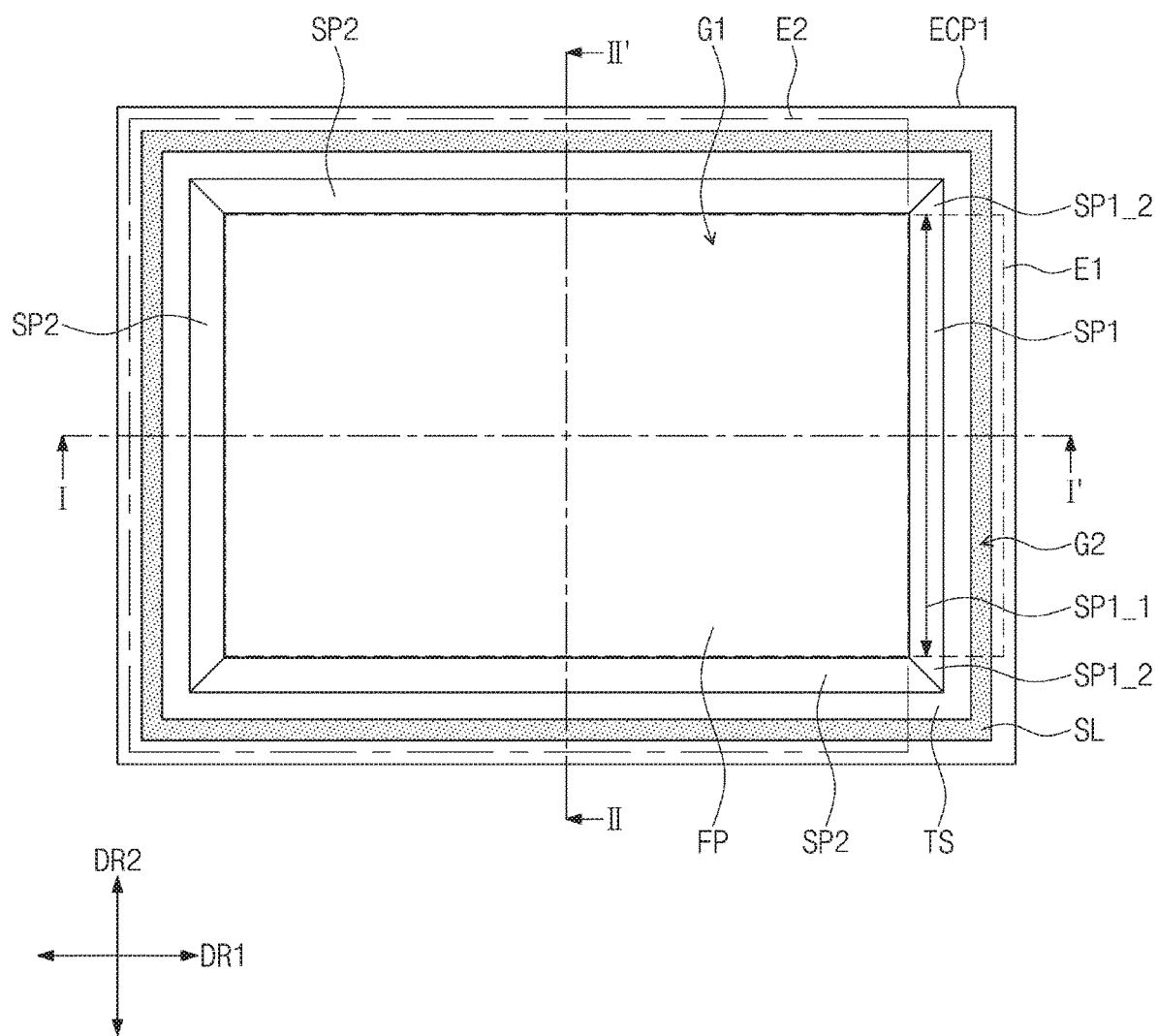
FIG. 1 is a plan view showing an electro-chromic panel according to a first exemplary embodiment of the present disclosure.

Hereinafter, exemplary embodiments of the present inventive concept will be explained in detail with reference to the accompanying drawings. The present disclosure and methods of accomplishing the same may be understood more readily by reference to the following detailed description of embodiments and the accompanying drawings. However, the present disclosure may be embodied in many different forms, and should not be construed as being limited to the embodiments set forth herein. Rather, these embodiments are provided so that this disclosure will be thorough and complete and will fully convey the concept of the invention to those skilled in the art, and the present disclosure will only be defined by the appended claims. Like numbers refer to like elements throughout.

It will be understood that when an element or layer is referred to as being "on", "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numbers refer to like elements throughout. As used herein, the term "and/or" includes any and all combinations of one or more of the associated listed items.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures.

It will be understood that, although the terms first, second, etc. may be used herein to describe various elements, components, and/or sections, these elements, components, and/or sections should not be limited by these terms. These terms are only used to distinguish one element, component, region, layer or section from another region, layer or section. Thus, a first element, component, or section discussed below could be termed a second element, component, or section without departing from the teachings of the present inventive concept.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, the present inventive concept will be explained in detail with reference to the accompanying drawings.

Figure 2:
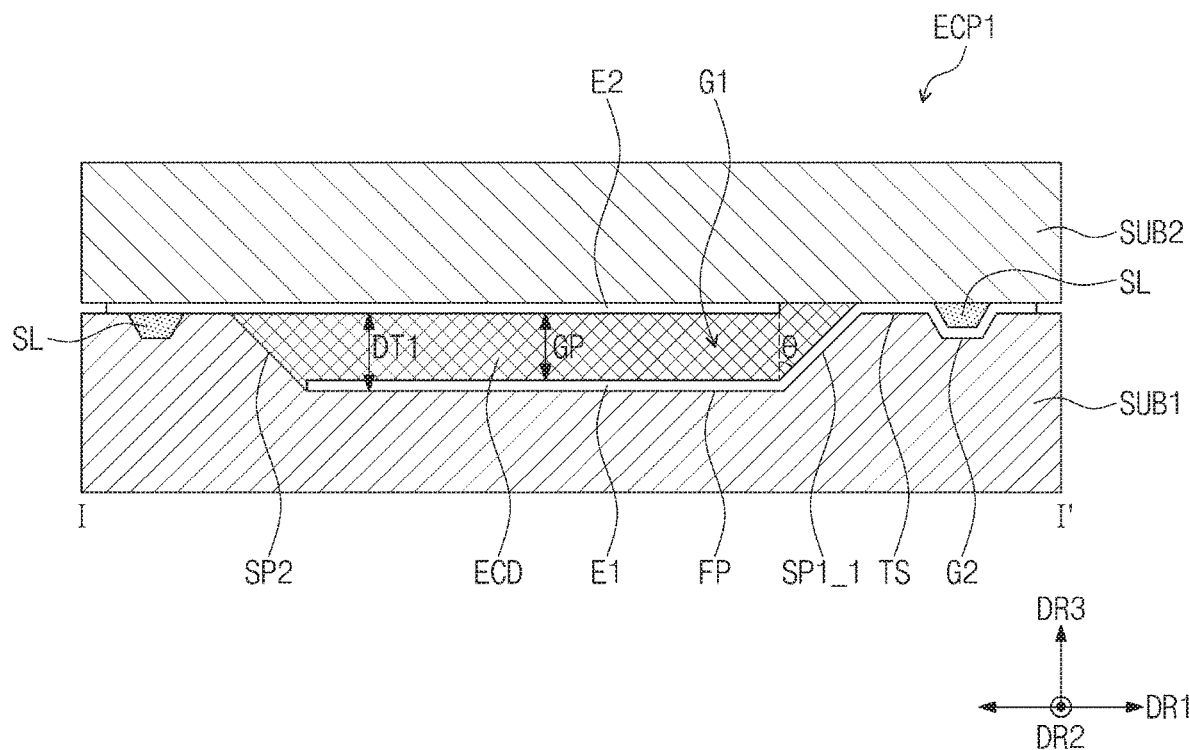
FIG. 2 is a cross-sectional view taken along a line I-I' of FIG. 1.
Figure 3:
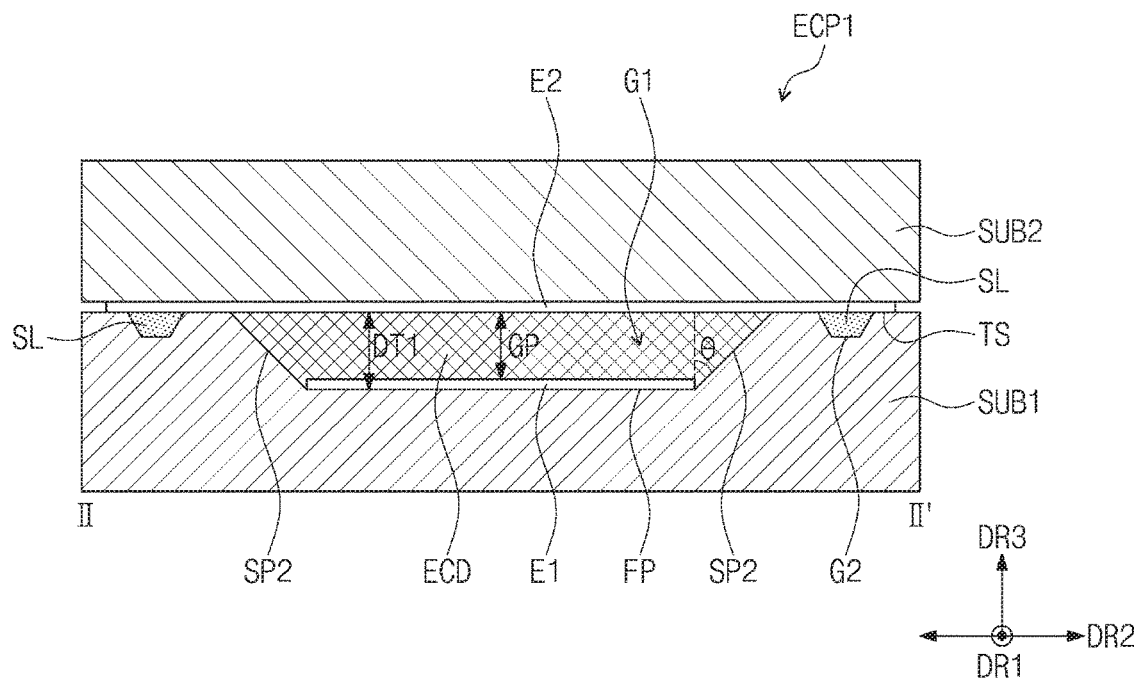
FIG. 3 is a cross-sectional view taken along a line II-II' of FIG. 1.

FIG. 1 is a plan view showing an electro-chromic panel according to a first exemplary embodiment of the present disclosure, FIG. 2 is a cross-sectional view taken along a line I-I' of FIG. 1, and FIG. 3 is a cross-sectional view taken along a line II-II' of FIG. 1.

Referring to FIGS. 1, 2, and 3, the electro-chromic panel ECP1 according to the present exemplary embodiment may have a rectangular shape having long sides in a first direction DR1 and short sides in a second direction DR2 crossing the first direction DR1.

The electro-chromic panel ECP1 includes a first substrate SUB1, a second substrate SUB2 facing the first substrate SUB1, a first electrode E1 disposed on the first substrate SUB1, a second electrode E2 disposed under the second substrate SUB2 to face the first electrode, and an electro-chromic device ECD is disposed between the first substrate SUB1 and the second substrate SUB2.

Although not shown in figures, the electro-chromic device ECD may include an ion storage layer, an electrolyte layer, and an electro-chromic layer sequentially stacked on the first electrode E1. Different electric potentials are provided to the first electrode E1 and the second electrode E2, respectively, to generate a potential difference between the first electrode E1 and the second electrode E2. As ions or electrons of the electrolyte layer move into the electro-chromic layer, an oxidation-reduction reaction occurs in the electro-chromic layer.

When a current flows from the electro-chromic layer to the ion storage layer, the electro-chromic layer may be colored, and when the current flows from the ion storage layer to the electro-chromic layer, the electro-chromic layer may be discolored.

When the electro-chromic layer is colored, the electro-chromic panel may operate in a reflective mode to reflect a light, and when the electro-chromic layer is discolored, the electro-chromic panel ECP1 may operate in a transmissive mode to transmit the light.

The first substrate SUB1 includes a bottom portion FP, slope portions SP1 and SP2 surrounding the bottom portion FP, and an upper portion TS connected to the bottom portion FP by the slope portions SP1 and SP2. The bottom portion FP faces a lower surface of the second substrate SUB2 and has a plane substantially parallel to the first and second directions DR1 and DR2. The bottom portion FP may have a rectangular shape having long sides in the first direction DR1 and short sides in the second direction DR2.

The upper portion TS is disposed higher than the bottom portion FP. The upper portion TS is spaced apart from the bottom portion FP and surrounds the bottom portion FP when viewed in a plane parallel to the bottom portion FP. That is, the upper portion TS may have a frame shape to surround the bottom portion FP. The upper portion TS faces the lower surface of the second substrate SUB2 and has a plane parallel to the bottom portion FP.

The slope portions SP1 and SP2 are disposed between the bottom portion FP and the upper portion TS when viewed in a plane parallel to the first and second directions DR1 and DR2. The frame shape of the upper portion TS includes an inner boundary adjacent to the bottom portion FP and an outer boundary opposite to the inner boundary. The slope portions SP1 and SP2 expand at a predetermined angle with respect to the plane of the bottom portion FP and connect a boundary of the bottom portion and the inner boundary of the upper portion TS. In detail, the slope portions SP1 and SP2 may have a slope angle of about 2.8 to about 89.4 degrees with respect to a third direction DR3 substantially perpendicular to the plane parallel to the first and second directions DR1 and DR2 to connect the boundary of the bottom portion and the inner boundary of the upper portion TS.

The slope portions SP1 and SP2 include a first slope portion SP1 connected to one side of the bottom portion FP in the first direction DR1 and a plurality of second slope portions SP2 connected to other sides of the bottom portion FP. The other sides of the bottom portion FP include both sides of the bottom portion FP in the second direction DR2 and the other side of the bottom portion FP in the first direction DR1. A width of each of the first and second slope portions SP1 and SP2 may gradually increase from the bottom portion FP toward the upper portion TS. The first and second slope portions SP1 and SP2 may be connected to each other to surround the bottom portion FP.

The first slope portion SP1 may include a first sub-slope portion SP1_1 connected to the one side of the bottom portion FP in the first direction DR1, having the same width as that of the bottom portion FP in the second direction DR2, and extending in the first direction DR1, and two second sub-slope portions SP1_2 extending from both sides of the first sub-slope portion SP1_1 in the second direction DR2. The second sub-slope portions SP1_2 are connected to boundaries of two second slope portions SP2 adjacent to the second sub-slope portions SP1_2 among the second slope portions SP2.

A first groove G1 is provided to the first substrate SUB1 and the first groove G1 is defined by the bottom portion FP and the slope portions SP1 and SP2 of the first substrate SUB1. The electro-chromic device ECD may be disposed in the first groove G1. The first groove G1 has a first depth DT1 and the first depth DT1 is defined as a difference in height between the bottom portion FP and the upper portion TS in the third direction DR3.

The first electrode E1 may be disposed on the bottom portion FP and the first sub-slope portion SP1_1. The first electrode E1 disposed on the bottom portion FP and the first sub-slope portion SP1_1 may extend in the first direction DR1 and may be disposed on a predetermined portion of the upper portion TS connected to the first sub-slope portion SP1_1. For convenience of explanation, the first electrode E1 of FIG. 1 is shown as a dotted line.

The second electrode E2 may be disposed to overlap with the bottom portion FP, the second slope portion SP2 connected to and/or in contact with the other side of the bottom portion FP in the first direction DR1, a predetermined portion of each of the second slope portions SP2 connected to and/or in contact with the both sides of the bottom portion FP in the second direction DR2, and a predetermined portion of the upper portion TS connected to and/or in contact with at least some of the second slope portions SP2. The second electrode E2 faces the first electrode E1 disposed on the bottom portion FP and does not make contact with the first electrode E1.

The second electrode E2 is not limited to the configuration shown in FIG. 1. For example, the second electrode E2 may be disposed to overlap with the bottom portion FP, the second slope portions SP2, and a predetermined portion of the upper portion TS connected to the second slope portions SP2.

The predetermined portion of each of the second slope portions SP2 connected to the both sides of the bottom portion FP in the second direction DR2 may be portions of the second slope portions SP2 except for a predetermined portion of each of the second slope portions SP2 adjacent to a boundary of each of the second sub-slope portions SP1_2. For the convenience of explanation, the first electrode E2 of FIG. 1 is shown as alternate long and short dash line.

If the first electrode E1 was disposed on the entire upper surface of the first substrate SUB1 and the second electrode E2 was disposed on the entire lower surface of the second substrate SUB2, the first electrode E1 and the second electrode E2 would be in contact with each other, and thus the first electrode E1 and the second electrode E2 would be short-circuited. Also, if the first electrode E1 was disposed on the bottom portion FP and the first and second slope portions SP1 and SP2, the first electrode E1 and the second electrode E2 would be in contact with each other, and as a result, they would be short-circuited. However, according to an embodiment of the inventive concept, since the first electrode E1 and the second electrode E2 are not in contact with each other, the first electrode E1 and the second electrode E2 are not short-circuited.

The electro-chromic device ECD may be disposed between the first electrode E1 and the second electrode E2 in the first groove G1. A predetermined space is defined between the first electrode E1 and the second electrode E2 by the first groove G1, the electro-chromic device ECD is disposed in the predetermined space, and as a result, a thickness of the electro-chromic panel ECP1 may be reduced. The first depth DT1 of the first groove G1 may be set so that a gap GP between the first electrode E1 and the second electrode E2 in the first groove G1 is within a range of about 100 micrometers to about 1000 micrometers. The gap GP corresponds to a distance between the first electrode E1 and the second electrode E2 in the third direction DR3.

The electro-chromic panel ECP1 includes a sealing member SL disposed in a second groove G2 that is provided to a predetermined area of the upper portion TS to surround the first groove G1. The second groove G2 may be formed by downwardly recessing a predetermined portion of the upper portion TS surrounding the first groove G1. A depth of the second groove G2 may be smaller than the first depth DT1 of the first groove G1.

The second groove G2 may extend through an area in which the first electrode E1 is disposed and an area in which the second electrode E2 is disposed. The sealing member SL is disposed on the first electrode E1 in a portion of the second groove G2 overlapping with the first electrode E1. That is, the first electrode E1 is disposed in the portion of the second groove G2, and then the sealing member SL is disposed on the first electrode E1

The second electrode E2 is disposed in a portion of the second groove G2, which is overlapped with the second electrode E2, to cover the sealing member SL. The sealing member SL may be cured to attach the first substrate SUB1 to the second substrate SUB2. The sealing member SL includes an organic material or an inorganic material.

Figure 4:
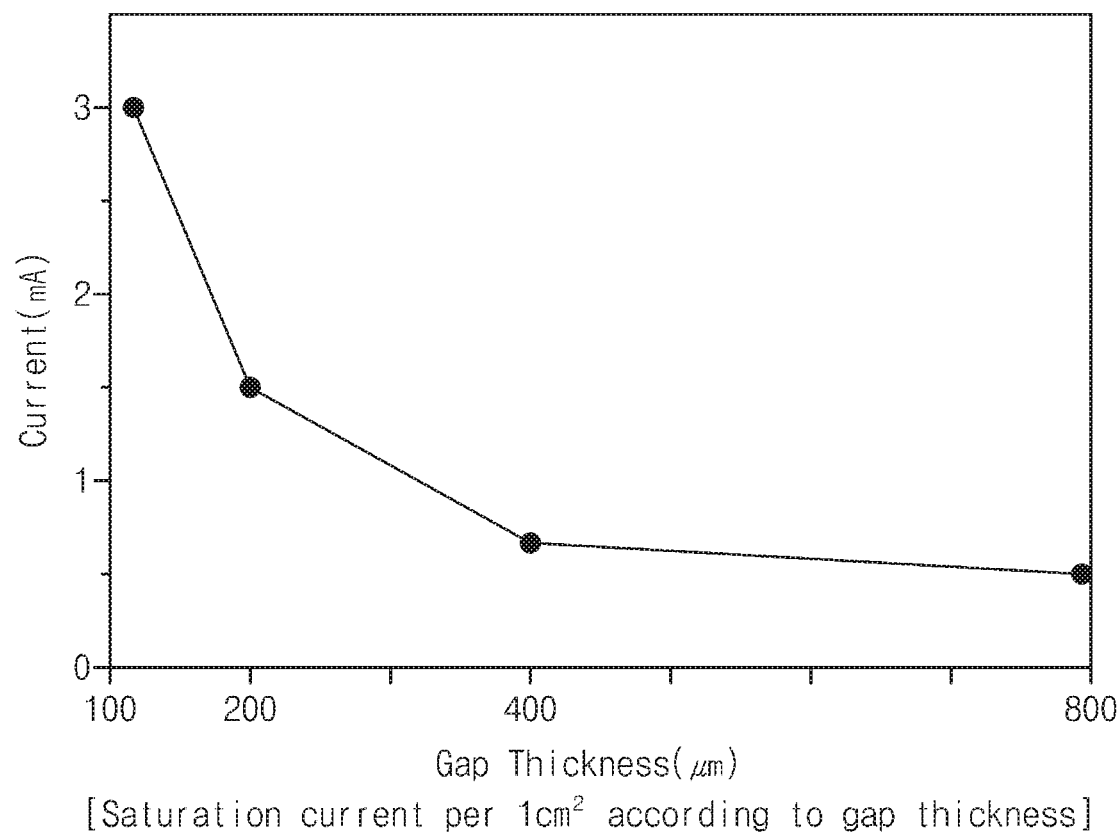
FIG. 4 is a graph showing a current consumption of the electro-chromic panel according to a gap between the first electrode and the second electrode.

FIG. 4 is a graph showing a current consumption of the electro-chromic panel according to a gap between the first electrode and the second electrode.

A gap thickness shown in FIG. 4 corresponds to the thickness of the gap GP between the first electrode E1 and the second electrode E2 in a portion in which the electro-chromic device ECD is disposed. A current shown in FIG. 4 represents a saturation current per 1 $cm^2$ and is substantially referred to as a "current consumption" of the electro-chromic panel ECP1.

As shown in FIG. 4, as the distance between the first electrode E1 and the second electrode E2 becomes larger, the current consumption becomes lower. Thus, as a depth of the first groove G1 becomes deeper, the current consumption becomes lower. However, since the first substrate SUB1 has a predetermined thickness, the depth of the first groove G1 is limited.

Also, when a thickness of the first substrate SUB1 becomes thicker so that the depth of the first groove G1 becomes deeper, a thickness of the electro-chromic panel ECP1 may become thicker. In an embodiment of the present inventive concept, the depth of the first groove G1 may be set so that the gap GP between the first electrode E1 and the second electrode E2 in the first groove G1 is within a range from about 100 micrometers to about 1000 micrometers by taking into account the current consumption and the thickness of the electro-chromic panel ECP1.

Since the first groove G1 is defined in the first substrate SUB1 and the electro-chromic device EDC is disposed in the first groove G1, the electro-chromic panel ECP1 according to the embodiment of the present inventive concept effectively secures the space for disposing the electron-chromic device ECD. As a result, the thickness and the current consumption of the electro-chromic panel ECP1 may be reduced.

Figure 5A:
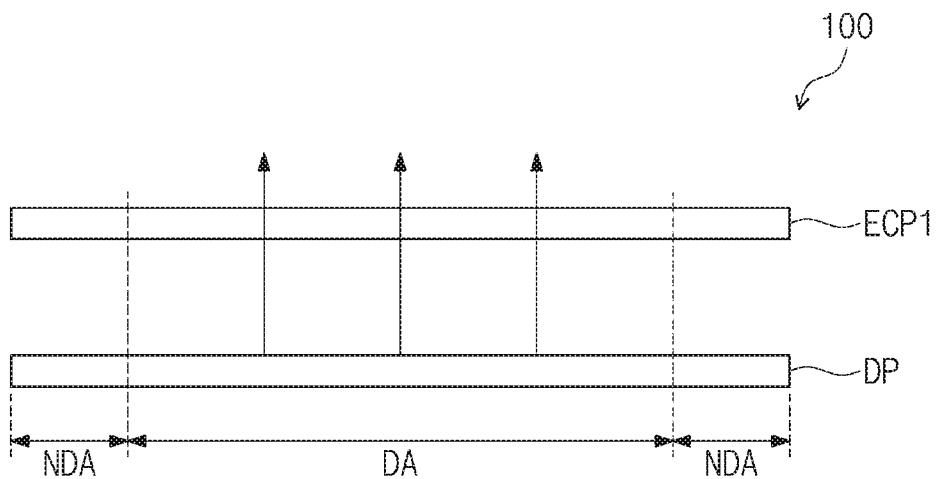
FIGS. 5A and 5B are views showing a display apparatus including the electro-chromic panel shown in FIG. 1.
Figure 5B:
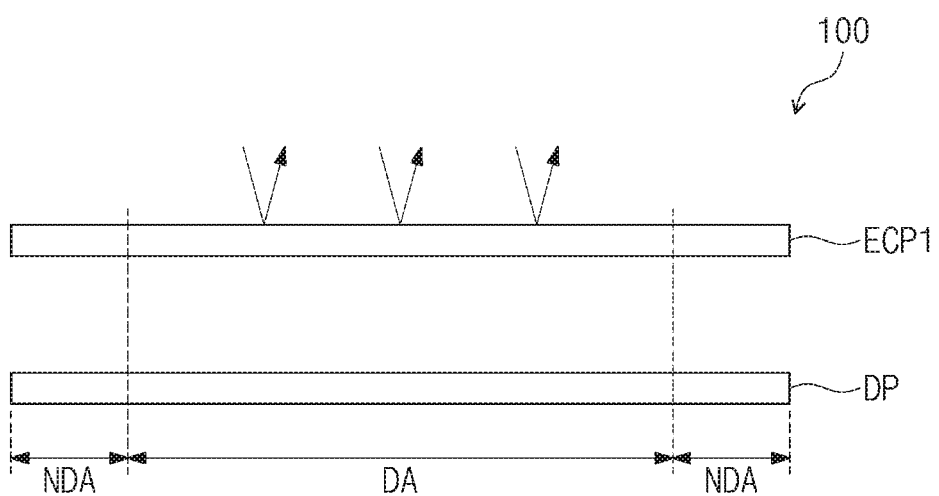

FIGS. 5A and 5B are views showing a display apparatus including the electro-chromic panel shown in FIG. 1.

FIG. 5A is a view showing a state of a display apparatus 100 when the electro-chromic panel ECP1 operates in the transmissive mode. FIG. 5B is a view showing a state of the display apparatus 100 when the electro-chromic panel ECP1 operates in the reflective mode.

Referring to FIGS. 5A and 5B, the display apparatus 100 includes a display panel DP displaying an image and the electro-chromic panel ECP1 disposed on the display panel DP.

Various display panels such as a liquid crystal display panel including a liquid crystal layer, an organic light emitting display panel including an organic light emitting layer, an electrowetting display panel including an electrowetting layer, an organic light emitting display panel including an organic light emitting layer, an electrophoretic display panel including an electrophoretic layer, etc., may be used as the display panel DP.

The display panel DP includes a display area DA and a non-display area NDA surrounding the display area DA. The display area DA displays the image, the non-display area NDA does not display the image, and a driver for driving the display area DA may be disposed in the non-display area NDA. Although not shown in FIGS. 5A and 5B, the first groove G1 may be disposed to correspond to the display area DA.

When the display panel DP generates the image, the electro-chromic panel ECP1 operates in the transmissive mode, and the image generated in the display panel DP may be provided to a user after transmitting through the electro-chromic panel ECP1. When the display panel DP does not generate the image and the electro-chromic panel ECP1 operates in the reflective mode, an external light may be reflected by the electro-chromic panel ECP1. Therefore, the electro-chromic panel ECP1 may have the same effect as a mirror in the reflective mode.

Figure 6:
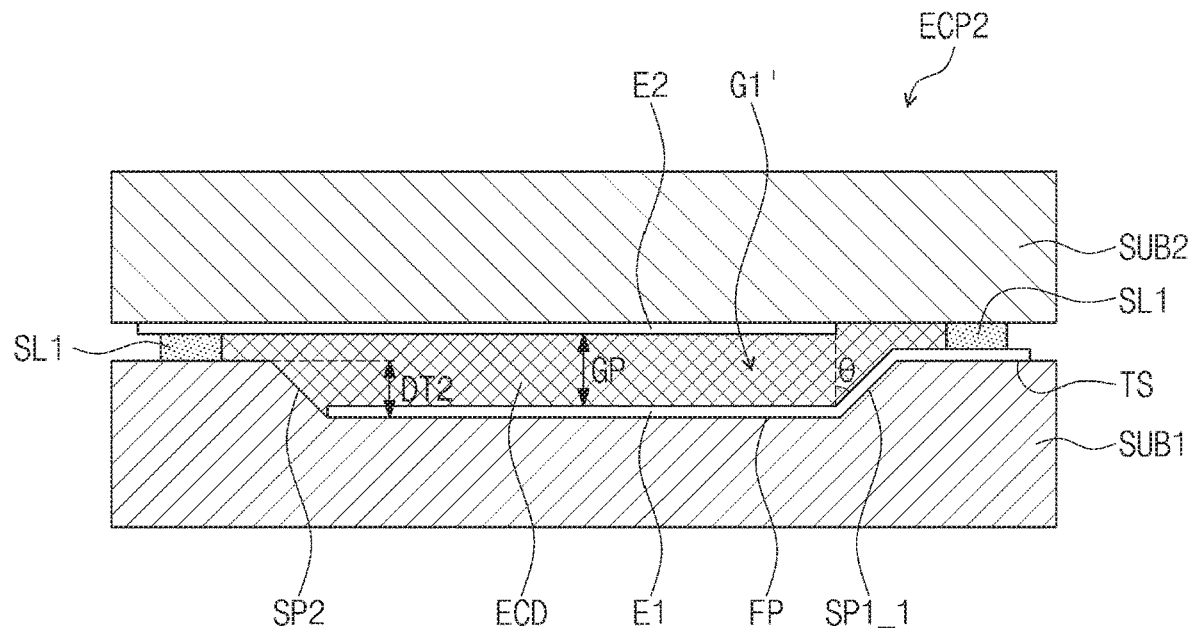
FIG. 6 is a cross-sectional view of an electro-chromic panel according to a second exemplary embodiment of the present disclosure.

FIG. 6 is a cross-sectional view of an electro-chromic panel according to a second exemplary embodiment of the present disclosure.

For the convenience of explanation, FIG. 6 shows as a cross-sectional view corresponding to the cross-sectional view shown in FIG. 2. An electro-chromic panel ECP2 shown in FIG. 6 may have the same structure and function as those of the electro-chromic panel ECP1 shown in FIG. 2 except for an arrangement of a sealing member SL1. Accordingly, different features of the electro-chromic panel ECP2 from those of the electro-chromic panel ECP1 will be mainly described, and the same elements of the electro-chromic panel ECP2 and the electro-chromic panel ECP1 will be assigned with the same reference numerals.

Referring to FIG. 6, the electro-chromic panel ECP2 includes the sealing member SL1 disposed on a predetermined portion of an upper portion TS of a first substrate SUB1 and surrounding a first groove G1'. The first substrate SUB1 and a second substrate SUB2 may be attached to each other by the sealing member SL1. Different from the electro-chromic panel ECP1, a second groove G2 is not provided to the first substrate SUB1 of the electro-chromic panel ECP2.

The first substrate SUB1 and the second substrate SUB2 may be disposed with a predetermined gap therebetween by the sealing member SL1 having a predetermined thickness. The gap between the first substrate SUB1 and the second substrate SUB2 may be maintained by the sealing member SL1.

A gap GP between a first electrode E1 and a second electrode E2 may be set to be within a range of about 100 micrometers to about 1000 micrometers. That is, the gap GP between a first electrode E1 and a second electrode E2 of the electro-chromic panel ECP1 is substantially equal to the gap GP between a first electrode E1 and a second electrode E2 of the electro-chromic panel ECP2.

The gap GP between the first electrode E1 and the second electrode E2 may be determined by the thickness of the sealing member SL1 and a depth of the first groove G1'. A second depth DT2 of the first groove G1' of the electro-chromic panel ECP2 may be smaller than the first depth DT1 of the first groove G1 of the electro-chromic panel ECP1 due to the thickness of the sealing member SL1.

An electro-chromic device ECD may be disposed in the first groove G1' and a space between the first substrate SUB1 and the second substrate SUB2, which is sealed by the sealing member SL1.

Figure 7:
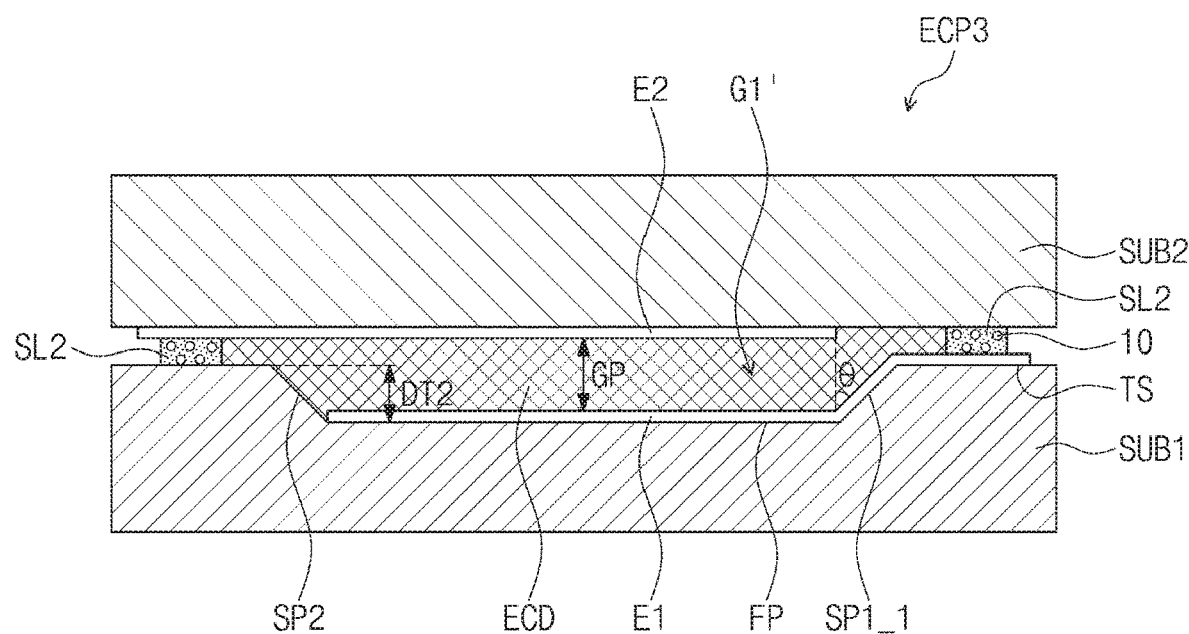
FIG. 7 is a cross-sectional view of an electro-chromic panel according to a third exemplary embodiment of the present disclosure.

FIG. 7 is a cross-sectional view of an electro-chromic panel according to a third exemplary embodiment of the present disclosure.

For the convenience of explanation, FIG. 7 shows a cross-sectional view corresponding to the cross-sectional view shown in FIG. 2. An electro-chromic panel ECP3 shown in FIG. 7 may have the same structure and function as those of the electro-chromic panel ECP2 shown in FIG. 6 except for an arrangement of a sealing member SL2. Accordingly, different features of the electro-chromic panel ECP3 from those of the electro-chromic panel ECP2 will be mainly described, and the same elements of the electro-chromic panel ECP3 and the electro-chromic panel ECP2 will be assigned with the same reference numerals.

Referring to FIG. 7, the electro-chromic panel ECP3 includes the sealing member SL2 disposed on a predetermined portion of an upper portion TS of a first substrate SUB1 and surrounding a first groove G1'. The first substrate SUB1 and a second substrate SUB2 may be attached to each other by the sealing member SL2.

The sealing member SL2 includes a plurality of spacers 10 and each of the spacers 10 may include an inorganic material. The inorganic material may have hardness harder than an organic material. Therefore, a gap between the first substrate SUB1 and the second substrate SUB2 may be maintained more firmly by the sealing member SL2 including the spacers.

Figure 8:
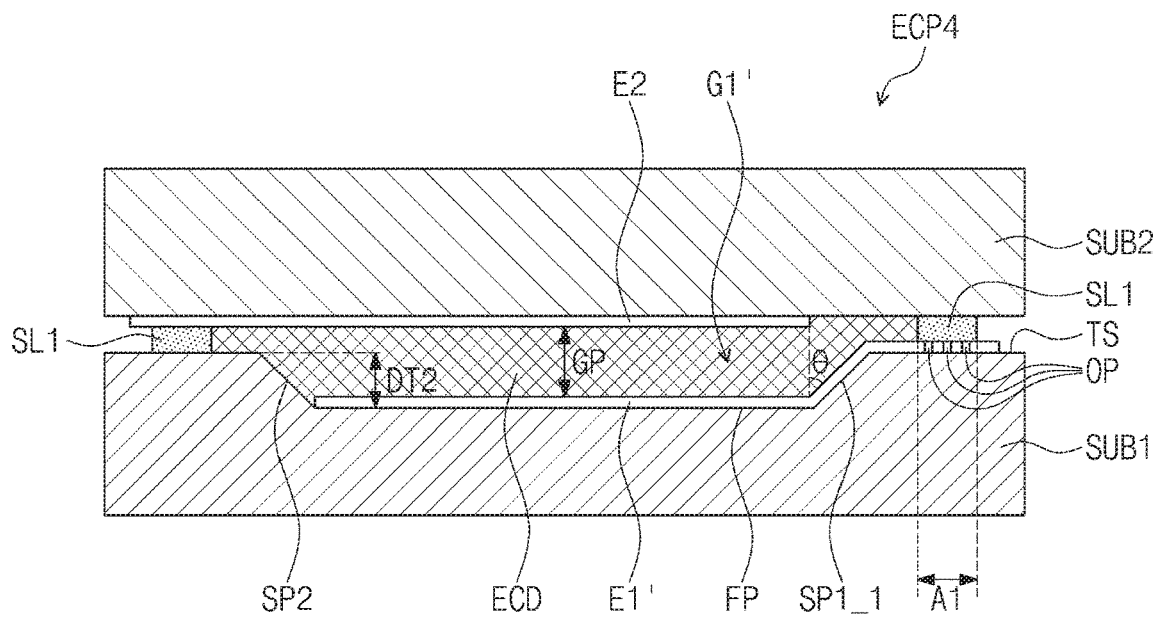
FIG. 8 is a cross-sectional view of an electro-chromic panel according to a fourth exemplary embodiment of the present disclosure.
Figure 9:
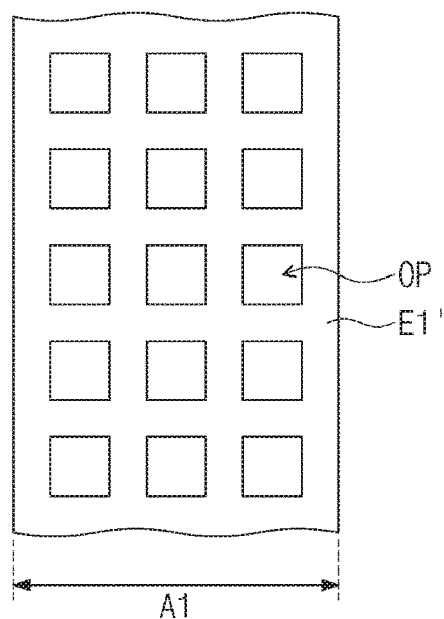
FIG. 9 is a plan view of an area A1 of a first electrode shown in FIG. 8.

FIG. 8 is a cross-sectional view of an electro-chromic panel according to a fourth exemplary embodiment of the present disclosure. FIG. 9 is a plan view of an area A1 of a first electrode shown in FIG. 8.

For the convenience of explanation, FIG. 8 shows a cross-sectional view corresponding to the cross-sectional view shown in FIG. 2. An electro-chromic panel ECP4 shown in FIG. 8 may have the same structure and function as those of the electro-chromic panel ECP2 shown in FIG. 6 except for a structure of a first electrode E1'. Accordingly, different features of the electro-chromic panel ECP4 from those of the electro-chromic panel ECP2 will be mainly described, and the same elements of the electro-chromic panel ECP4 and the electro-chromic panel ECP2 will be assigned with the same reference numerals.

Referring to FIG. 8 and FIG. 9, a sealing member SL1 is disposed on a predetermined portion of an upper portion TS of a first substrate SUB1, surrounds a first groove G1', and attaches the first substrate SUB1 to a second substrate SUB2. The sealing member SL1 may extend through an area of the upper portion TS on which the first electrode E1' is disposed. A portion of the first electrode E1' overlapping with the sealing member SL1 includes a plurality of open portions OP. The open portions OP may be substantially defined by removing portions of the first electrode E1'.

When the sealing member SL1 is cured, a stress may be applied to the first electrode E1' through a portion where the sealing member SL1 and the first electrode E1' are in contact with each other. In a comparative example, when the stress increases, the first electrode E1' disposed on the upper portion TS of the first substrate SUB1 may be detached from the first substrate SUB1. As the portion where the sealing member SL1 and the first electrode E1' are in contact with each other becomes larger, the stress may become greater.

In an embodiment of the present inventive concept, since the first electrode E1' overlapping the sealing member SL1 includes the open portions OP from which the first electrode E1' is removed, the contact portion of the sealing member SL1 and the first electrode E1' may become smaller. As a result, since the stress applied to the first electrode E1' is reduced when the sealing member SL1 is cured, the first electrode E1' may be presented from being detached from the first substrate SUB1.

Figure 10:
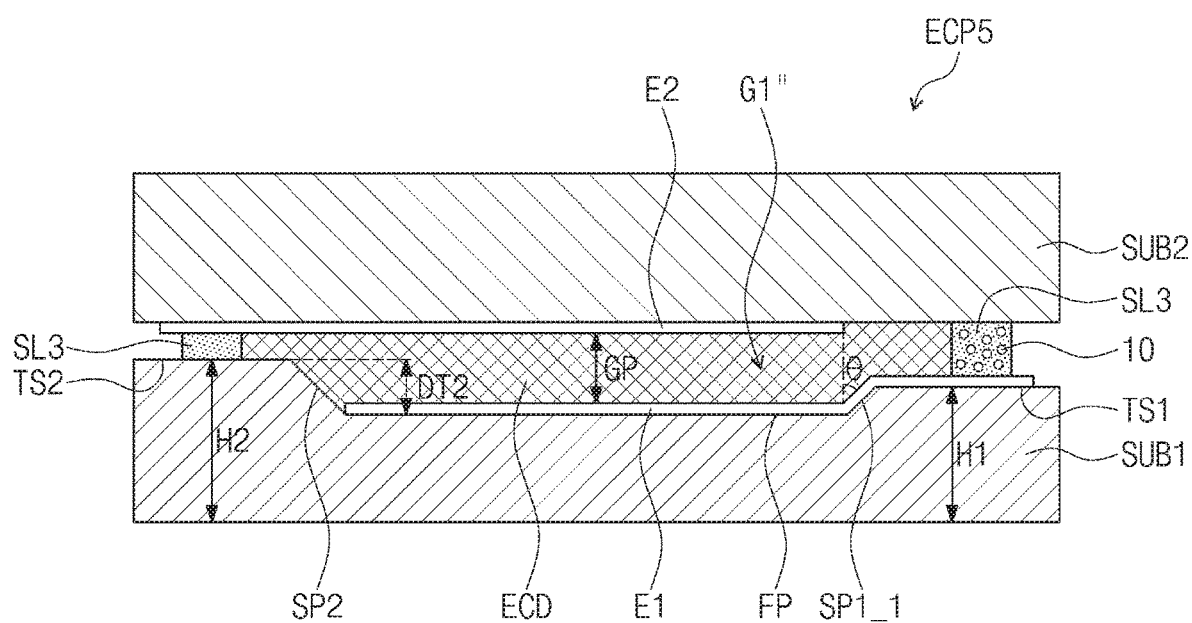
FIG. 10 is a cross-sectional view of an electro-chromic panel according to a fifth exemplary embodiment of the present disclosure.

FIG. 10 is a cross-sectional view of an electro-chromic panel according to a fifth exemplary embodiment of the present disclosure.

For the convenience of explanation, FIG. 10 shows a cross-sectional view corresponding to the cross-sectional view shown in FIG. 2. An electro-chromic panel ECP5 shown in FIG. 10 may have the same structure and function as those of the electro-chromic panel ECP2 shown in FIG. 6 except for structures of a sealing member SL3 and an upper portion TS1 and TS2 of a first substrate SUB1. Accordingly, different features of the electro-chromic panel ECP5 from those of the electro-chromic panel ECP2 will be mainly described, and the same elements of the electro-chromic panel ECP5 and the electro-chromic panel ECP2 will be assigned with the same reference numerals.

Referring to FIG. 10, the upper portion TS1 and TS2 includes a first upper portion TS1 connected to a first slope portion SP1 and a second upper portion TS2 connected to a second slope portion SP2. A first height H1 of the first upper portion TS1 defined by a height from a bottom surface of the first substrate SUB1 to the first upper portion TS1 in a third direction DR3 may be lower than a second height H2 of the second upper portion TS2 defined by a height from a bottom surface of the first substrate SUB1 to the second upper portion TS2 in the third direction DR3. A gap between the first upper portion TS1 and a second substrate SUB2 is larger than a gap between the second upper portion TS2 and the second substrate SUB2.

The sealing member SL3 is disposed on a predetermined portion of each of the first and second upper portions TS1 and TS2, surrounds a first groove G1", and attaches the first substrate SUB1 to the second substrate SUB2. Since the gap between the first upper portion TS1 and the second substrate SUB2 is larger than the gap between the second upper portion TS2 and the second substrate SUB2, a thickness of a sealing member SL3 disposed on the first upper portion TS1 of the sealing member SL3 may be greater than a thickness of a sealing member SL3 disposed on the second upper portion TS2 of the sealing member SL3.

Since the gap between the first upper portion TS1 and the second substrate SUB2 is larger than the gap between the second upper portion TS2 and the second substrate SUB2, the sealing member SL3 disposed on the first upper portion TS1 may in dude a plurality of spacers 10 in order to maintain more firmly the gap between the first upper portion TS1 and the second substrate SUB2.

Although the exemplary embodiments of the present disclosure have been described, it is understood that the present disclosure should not be limited to these exemplary embodiments but various changes and modifications can be made by one ordinary skilled in the art within the spirit and scope of the present disclosure as hereinafter claimed.

What is claimed is:

1. An electro-chromic panel comprising:
   a first substrate;
   a first electrode disposed on the first substrate;
   a second substrate facing the first substrate;
   a second electrode disposed under the second substrate to face the first electrode; and
   an electro-chromic device disposed between the first substrate and the second substrate, the first substrate comprising:
      a bottom portion facing the second substrate;
      an upper portion disposed higher than the bottom portion, the upper portion being spaced apart from the bottom portion and surrounding the bottom portion when viewed in a plane substantially parallel to the bottom portion; and
      slope portions comprising a first portion and plurality of second portions, the slope portions disposed between the bottom portion and the upper portion to connect a boundary of the bottom portion and an inner boundary of the upper portion adjacent to the boundary of the bottom portion,
   wherein the first electrode is continuously disposed on both the bottom portion and a predetermined portion of the first slope portion connected to one side of the bottom portion, the second electrode is disposed to overlap the bottom portion and a second slope portion of the plurality of second slope portions and not to overlap the first slope portion, the second slope portion connected to another side of the bottom portion, and the electro-chromic device is disposed between the first substrate and the second substrate in a first groove defined by the bottom portion and the slope portions.

2. The electro-chromic panel of claim 1, wherein the bottom portion has a rectangular shape having long sides in a first direction and short sides in a second direction crossing the first direction.

3. The electro-chromic panel of claim 2, wherein the first slope portion comprises a first sub-slope portion connected to the one side of the bottom portion in the first direction, having a same width as the bottom portion in the second direction, and extending in the first direction, the first and second slope portions are connected to each other to surround the bottom portion, and a width of each of the first and second slope portions gradually increases from the bottom portion toward the upper portion.

4. The electro-chromic panel of claim 3, wherein the first electrode is disposed on the bottom portion, the first sub-slope portion, and a predetermined portion of the upper portion connected to the first sub-slope portion.

5. The electro-chromic panel of claim 3, wherein the second electrode is disposed to overlap the bottom portion, the second slope portions, and a predetermined portion of the upper portion connected to the second slope portions.

6. The electro-chromic panel of claim 3, wherein the first and second slope portions have a slope angle of about 2.8 to about 89.4 degrees with respect to a third direction substantially perpendicular to the plane parallel to the first and second directions.

7. The electro-chromic panel of claim 6, wherein a gap in the third direction between the first electrode and the second electrode in the first groove is within a range of about 100 micrometers to about 1000 micrometers.

8. The electro-chromic panel of claim 1, further comprising a sealing member disposed in a second groove which surrounds the first groove and is provided to a predetermined area of the upper portion.

9. The electro-chromic panel of claim 8, wherein the second groove has a depth smaller than a depth of the first groove.

10. The electro-chromic panel of claim 8, wherein the second groove extends through an area in which the first electrode is disposed.

11. The electro-chromic panel of claim 10, wherein the sealing member is disposed on the first electrode in a portion of the second groove overlapping with the first electrode.

12. The electro-chromic panel of claim 8, wherein the sealing member comprises an organic material or an inorganic material.

13. The electro-chromic panel of claim 1, further comprising a sealing member disposed on a predetermined portion of the upper portion, surrounding the first groove, and attaching the first substrate to the second substrate.

14. The electro-chromic panel of claim 13, wherein the electro-chromic device is disposed in a space, which is closed by the sealing member, between the first substrate and the second substrate.

15. The electro-chromic panel of claim 13, wherein the sealing member comprises a plurality of spacers comprising an inorganic material.

16. The electro-chromic panel of claim 13, wherein the sealing member extends through an area of the upper portion in which the first electrode is disposed, and a portion of the first electrode overlapping with the sealing member comprises a plurality of open portions.

17. The electro-chromic panel of claim 1, wherein the upper portion comprises:
- a first upper portion connected to the slope portion connected to the one side of the bottom portion; and
- a second upper portion connected to the slope portion connected to at least one of the other sides of the bottom portion, and the first upper portion has a height lower than a height of the second upper portion.

18. The electro-chromic panel of claim 17, further comprising a sealing member disposed on a predetermined portion of the upper portion and surrounding the first groove, and attaching the first substrate to the second substrate, and a thickness of a sealing member disposed on the first upper portion of the sealing member is greater than a thickness of a sealing member disposed on the second upper portion of the sealing member.

19. The electro-chromic panel of claim 18, wherein the sealing member disposed on the first upper portion comprises a plurality of spacers comprising an inorganic material.

20. A display apparatus comprising:
- a display panel displaying an image; and
- an electro-chromic panel disposed on the display panel, wherein the electro-chromic panel comprises:
- a first substrate;
- a first electrode disposed on the first substrate;
- a second substrate facing the first substrate;
- a second electrode disposed under of the second substrate to face the first electrode; and
- an electro-chromic device disposed between the first substrate and the second substrate, the first substrate comprising:
- a bottom portion facing the second substrate;
- an upper portion disposed higher than the bottom portion, the upper portion being spaced apart from the bottom portion and surrounding the bottom portion when viewed in a plane substantially parallel to the bottom portion; and
- slope portions comprising a first slope portion and a plurality of second slope portions, the slope portions disposed between the bottom portion and the upper portion to connect a boundary of the bottom portion and an inner boundary of the upper portion adjacent to the boundary of the bottom portion,
wherein the first electrode is continuously disposed on both the bottom portion and a predetermined portion of the first slope portion connected to one side of the bottom portion, the second electrode is disposed to overlap the bottom portion and a second slope portion of the slope portions and not to overlap the first slope portion, the second slope portion connected to another side of the bottom portion, and the electro-chromic device is disposed between the first substrate and the second substrate in a first groove defined by the bottom portion and the slope portions.

* * * * *